US011279368B2

(12) United States Patent
Chen

(10) Patent No.: US 11,279,368 B2
(45) Date of Patent: *Mar. 22, 2022

(54) SYSTEM AND METHOD FOR DETERMINING SAFETY SCORE OF DRIVER

(71) Applicant: BEIJING DIDI INFINITY TECHNOLOGY AND DEVELOPMENT CO., LTD., Beijing (CN)

(72) Inventor: Hao Chen, Beijing (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/870,907

(22) Filed: May 9, 2020

(65) Prior Publication Data
US 2020/0269851 A1 Aug. 27, 2020

Related U.S. Application Data

(63) Continuation of application No. 16/232,130, filed on Dec. 26, 2018, now Pat. No. 10,689,002, which is a
(Continued)

(51) Int. Cl.
B60W 40/09 (2012.01)
G06Q 50/30 (2012.01)
(Continued)

(52) U.S. Cl.
CPC ............ *B60W 40/09* (2013.01); *G06F 17/18* (2013.01); *G06N 5/046* (2013.01);
(Continued)

(58) Field of Classification Search
CPC . B60W 40/09; G06Q 40/08; G06Q 10/06393; G06Q 10/06398; G06Q 50/30; G06F 17/18; G06N 5/046
See application file for complete search history.

(56) References Cited

U.S. PATENT DOCUMENTS 7,627,422 B2 * 12/2009 Adamczyk ............. G06Q 10/06
701/516
10,192,387 B2 * 1/2019 Brinig ................... H04W 4/021
(Continued)

FOREIGN PATENT DOCUMENTS

CN 104200267 A 12/2014
CN 105260932 A 1/2016
(Continued)

OTHER PUBLICATIONS

Examination Report in Japanese Application No. 2018-566231 dated Mar. 9, 2020, 11 pages.
(Continued)

Primary Examiner — Hongmin Fan
(74) Attorney, Agent, or Firm — Metis IP LLC

(57) ABSTRACT

The present disclosure relates to a method and system for determining a safety score associated with driver. The method includes: obtaining, by at least one computer, historical transportation service transaction data associated with an identification of a target driver; extracting, by the at least one computer, at least one target feature based on the historical transportation service transaction data; obtaining, by the at least one computer, an estimation model for estimating a safety score that reflects a safety expectation of a driver during transportation services; determining, by the at least one computer, a safety score associated with the target driver based on the estimation model and the at least one target feature; and providing, by the at least one com-
(Continued)

puter, an offer to enter a contract to the target driver based on the safety score.

20 Claims, 9 Drawing Sheets

Related U.S. Application Data continuation of application No. PCT/CN2017/080852, filed on Apr. 18, 2017.

(51) Int. Cl.
*G06Q 40/08* (2012.01)
*G06F 17/18* (2006.01)
*G06N 5/04* (2006.01)
*G06Q 10/06* (2012.01)

(52) U.S. Cl.
CPC . *G06Q 10/06393* (2013.01); *G06Q 10/06398* (2013.01); *G06Q 40/08* (2013.01); *G06Q 50/30* (2013.01)

(56) References Cited

U.S. PATENT DOCUMENTS

| | | | |
|---|---|---|---|
| 10,311,749 | B1 | 6/2019 | Kypri et al. |
| 10,972,884 | B2 * | 4/2021 | Khan ................... G08G 1/202 |
| 2010/0030582 | A1 | 2/2010 | Rippel et al. |
| 2010/0063850 | A1 | 3/2010 | Sayo |
| 2015/0161564 | A1 | 6/2015 | Sweeney et al. |
| 2015/0187014 | A1 | 7/2015 | Adams et al. |
| 2016/0288797 | A1 | 10/2016 | Takahashi et al. |
| 2018/0137594 | A1 | 5/2018 | Marco |

FOREIGN PATENT DOCUMENTS

| | | |
|---|---|---|
| CN | 106023344 A | 10/2016 |
| JP | 2006011726 A | 1/2006 |
| JP | 2014065362 A | 4/2014 |
| JP | 5889761 B2 | 3/2016 |

OTHER PUBLICATIONS

International Search Report in PCT/CN2017/080852 dated Jan. 16, 2018, 5 pages.
Written Opinion in PCT/CN2017/080852 dated Jan. 16, 2018, 4 pages.
Extended European Search Report in European Application No. 17906689.9 dated Apr. 3, 2019, 9 pages.
Bartosz Swiderski et al., Multistage Classification by Using Logistic Regression and Neural Networks for Assessment of Financial Condition of Company, Decision Support Systems, 52(2): 539-547, 2012.
Nebojsa Nikolic et al., The Application of Brute Force Logistic Regression to Corporate Credit Scoring Models Evidence from Serbian Financial Statements, Expert Systems with Applications, 40(15); 5932-5944, 2013.
Mahmood Bakhtiyari et al., An Epidemiological Survey on Road Traffic Crashes in Iran: Application of the Two Logistic Regression Models, International Journal of Injury Control and Safety Promotion, 21(2): 103-109, 2014.
First Office Action in Chinese Application No. 201780039729.1 dated Feb. 1, 2021, 14 pages.
Eftim Zdravevski et al., Weight of evidence as a tool for attribute transformation in the preprocessing stage of supervised learning algorithms, 2011 International Joint Conference on Neural Networks (IJCNN), 2011, 8 pages.
Dewan MD. Farid et al., Assigning Weights to Training Instances Increases Classification Accuracy, International Journal of Data Mining & Knowledge Management Process (IJDKP), 3(1): 13-25, 2013.
Third Examination Report in Australian Application No. 2017410523 dated Oct. 29, 2020, 6 pages.
The Second Office Action in Chinese Application No. 201780039729.1 dated Jun. 24, 2021, 13 pages.
Cui, Xinming et al., Comparison and Selection of Weight Determination Methods, Research, Development and Engineering Demonstration of Complete sets of Energy-saving Technologies for Residential Buildings, 2009, 80 pages.

* cited by examiner

SYSTEM AND METHOD FOR DETERMINING SAFETY SCORE OF DRIVER

CROSS-REFERENCE TO RELATED APPLICATIONS

This application is a continuation of U.S. application Ser. No. 16/232,130, filed on Dec. 26, 2018, which is a Continuation of International Application No. PCT/CN2017/080852, filed on Apr. 18, 2017, the entire contents of each of which are hereby incorporated by reference.

TECHNICAL FIELD

This application relates generally to machine learning, and in particular, a system and method for determining a safety score of a driver.

BACKGROUND

Online on-demand transportation services, such as online taxi hailing, becomes more and more popular. An application platform, such as DiDi Chuxing™, pays more attention to driving safety of drivers. Currently, the driving safety is mostly determined based on traditional sample interviews and/or questionnaires without an appropriate technology and/or a mature model algorithm. The timeliness and coverage are limited such that it is difficult to determine the driving safety associated with a driver easily.

SUMMARY

In one aspect of the present disclosure, a system is provided. The system may include a computer-readable storage medium storing a set of instructions for providing an offer to enter a contract to a driver. The system may also include a processor in communication with the computer-readable storage medium, wherein when executing the set of instructions, the processor may be directed to: obtain historical transportation service transaction data associated with an identification of a target driver; extract at least one target feature based on the historical transportation service transaction data; obtain an estimation model for estimating a safety score that reflects a safety expectation of a driver during transportation services; determine a safety score associated with the target driver based on the estimation model and the at least one target feature; and provide an offer to enter a contract to the target driver based on the safety score.

In another aspect of the present disclosure, a method is provided. The method is related to the method of determining a safety score associated with a target driver. The method may include: obtaining, by at least one computer, historical transportation service transaction data associated with an identification of a target driver; extracting, by the at least one computer, at least one target feature based on the historical transportation service transaction data; obtaining, by the at least one computer, an estimation model for estimating a safety score that reflects a safety expectation of a driver during transportation services; determining, by the at least one computer, a safety score associated with the target driver based on the estimation model and the at least one target feature; and providing, by the at least one computer, an offer to enter a contract to the target driver based on the safety score.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
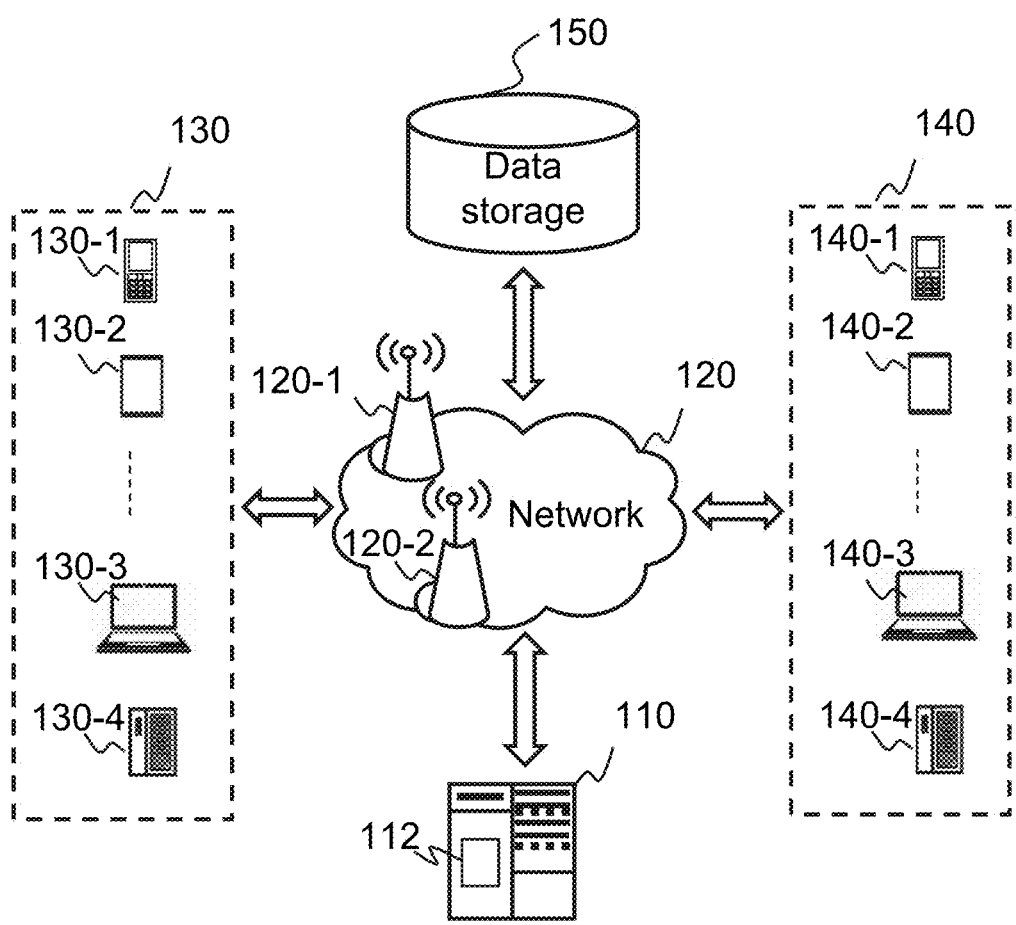
FIG. 1 is a block diagram of an exemplary system for on-demand service according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Moreover, while the system and method in the present disclosure is described primarily in regard to allocate a set of sharable orders, it should also be understood that this is only one exemplary embodiment. The system or method of the present disclosure may be applied to any other kind of on demand service. For example, the system or method of the present disclosure may be applied to transportation systems of different environments including land, ocean, aerospace, or the like, or any combination thereof. The vehicle of the transportation systems may include a taxi, a private car, a hitch, a bus, a train, a bullet train, a high speed rail, a subway, a vessel, an aircraft, a spaceship, a hot-air balloon, a driverless vehicle, or the like, or any combination thereof. The transportation system may also include any transportation system for management and/or distribution, for example, a system for sending and/or receiving an express. The application of the system or method of the present disclosure may include a webpage, a plug-in of a browser, a client terminal, a custom system, an internal analysis system, an artificial intelligence robot, or the like, or any combination thereof.

The term "passenger," "requester," "service requester," and "customer" in the present disclosure are used interchangeably to refer to an individual or an entity that may request or order a service. Also, the term "driver," "provider," "service provider," and "supplier" in the present disclosure are used interchangeably to refer to an individual or an entity that may provide a service or facilitate the providing of the service. The term "user" in the present disclosure may refer to an individual, an entity or a tool that may request a service, order a service, provide a service, or facilitate the providing of the service. For example, the user may be a passenger, a driver, an operator, or the like, or any combination thereof. In the present disclosure, "passenger," "passenger terminal," "user terminal," and "passenger terminal" may be used interchangeably, and "driver" and "driver terminal" may be used interchangeably.

The term "service request" and "order" in the present disclosure are used interchangeably to refer to a request that may be initiated by a passenger, a requester, a service requester, a customer, a driver, a provider, a service provider, a supplier, or the like, or any combination thereof. The service request may be accepted by any one of a passenger, a requester, a service requester, a customer, a driver, a provider, a service provider, or a supplier. The service request may be chargeable or free.

The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (Wi-Fi) positioning technology, or the like, or any combination thereof. One or more of the above positioning systems may be used interchangeably in the present disclosure.

An aspect of the present disclosure relates to online systems and methods for determining a safety score of a driver, such as a taxi driver, in order to provide services, such as an auto insurance or allocating business opportunities, to the driver. To this end, the online on-demand service platform may first obtain driving history of a target driver; and then extract safety related features of the driver from his/her driving history; determine a safety score for the target driver. The platform may provide an offer of auto insurance or offer of taxi driving service to the target driver based on the safety score. Since the features are pre-approved to be highly relevant to the safety expectation of the driver, the safety score has a certain reference value for the online service platform to allocate a new order or a high quality order. It may also be useful for the system to determine whether to provide a discount when the target driver buys an insurance.

It should be noted that, the technical problem and solution are rooted in online on-demand service, which is a new form of service further rooted only in post-Internet era. It provides technical solutions to users that could raise only in post-Internet era. In pre-Internet era, when a user hails a taxi on street, the taxi request and acceptance occur only between the passenger and one taxi driver that sees the passenger. If the passenger hails a taxi through telephone call, the service request and acceptance may occur only between the passenger and one service provider (e.g., one taxi company or agent). Besides, the driving safety associated with a driver is not available for a passenger or an insurance company. Online taxi, however, allows a user of the service to real-time and automatic distribute a service request to a vast number of individual service providers (e.g., taxi drivers) distance away from the user. It also allows a plurality of service provides to respond to the service request simultaneously and in real-time. Besides, the safety score associated with a driver is available for the online on-demand transportation system and/or the insurance company. Therefore, through Internet, the online on-demand transportation systems may provide a much more efficient transaction platform for the users and the service providers, and the insurance company may also provide a discount to a driver based on the safety score that may never met in a traditional pre-Internet transportation service system.

FIG. 1 is a block diagram of an exemplary on-demand service system 100 according to some embodiments. The on-demand service system 100 may include an online transportation service platform for transportation services such as taxi hailing, chauffeur service, express car, carpool, bus service, driver hire and shuttle service. The on-demand service system 100 may be an online platform including a server 110, a network 120, one or more user terminals (e.g., one or more passenger terminals 130, driver terminals 140), and a data storage 150. The server 110 may include a processing engine 112.

In some embodiments, the server 110 may be a single server, or a server group. The server group may be centralized, or distributed (e.g., the server 110 may be a distributed system). In some embodiments, the server 110 may be local or remote. For example, the server 110 may access information and/or data stored in the passenger terminal 130, the driver terminal 140, and/or the data storage 150 via the network 120. As another example, the server 110 may be directly connected to the passenger terminal 130, the driver terminal 140, and/or the data storage 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to the service request to perform one or more functions described in the present disclosure. For example, the processing engine 112 may determine a target driver by a safety score based on the service request obtained from the passenger terminal 130. In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components in the on-demand service system 100 (e.g., the server 110, the passenger terminal 130, the driver terminal 140, and the data storage 150) may send information and/or data to other component(s) in the on-demand service system 100 via the network 120. For example, the server 110 may enter a contract to a target driver based on the safety score via the network 120. In some embodiments, the network 120 may be any type of wired or wireless network, or combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the on-demand service system 100 may be connected to the network 120 to exchange data and/or information.

In some embodiments, a service requester may be a user of the passenger terminal 130. In some embodiments, the user of the passenger terminal 130 may be someone other than the service requester. For example, a user A of the passenger terminal 130 may use the passenger terminal 130 to send a service request for a user B, or receive service and/or information or instructions from the server 110. In some embodiments, a provider may be a user of the driver terminal 140. In some embodiments, the user of the driver terminal 140 may be someone other than the provider. For example, a user C of the driver terminal 140 may user the driver terminal 140 to receive a service request for a user D, and/or information or instructions from the server 110.

In some embodiments, the passenger terminal 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, smart glasses, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass, an Oculus Rift, a Hololens, a Gear VR, etc. In some embodiments, built-in device in the motor vehicle 130-4 may include an onboard computer, an onboard television, etc. In some embodiments, the passenger terminal 130 may be a device for storing service transaction data of the service requester and/or the passenger terminal 130. In some embodiments, the passenger terminal 130 may be a device with positioning technology for locating the position of the service requester and/or the passenger terminal 130.

In some embodiments, the driver terminal 140 may be similar to, or the same device as the passenger terminal 130. In some embodiments, the driver terminal 140 may be a device for storing service transaction data of the driver and/or the driver terminal 140. In some embodiments, the driver terminal 140 may be a device with positioning technology for locating the position of the service provider and/or the driver terminal 140. In some embodiments, the passenger terminal 130 and/or the driver terminal 140 may communicate with other positioning device to determine the position of the service requester, the passenger terminal 130, the driver, and/or the driver terminal 140. In some embodiments, the passenger terminal 130 and/or the driver terminal 140 may send positioning information to the server 110.

The data storage 150 may store data and/or instructions. In some embodiments, the data storage 150 may store data obtained from the passenger terminal 130 and/or the driver terminal 140. In some embodiments, the data storage 150 may store data relating to vehicle accidents associated with the passenger terminal 130 and/or the driver terminal 140. The data relating to vehicle accidents may include vehicle accident compensation data. The data storage 150 may obtain the data relating to vehicle accidents from a third party (e.g., a traffic department, an insurance institution, etc.) via the network 120. In some embodiments, the data storage 150 may store data and/or instructions that the server 110 may execute or use to perform exemplary methods described in the present disclosure. In some embodiments, data storage 150 may include a mass storage, a removable storage, a volatile read-and-write memory, a read-only memory (ROM), or the like, or any combination thereof. Exemplary mass storage may include a magnetic disk, an optical disk, a solid-state drives, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the data storage 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the data storage 150 may be connected to the network 120 to communicate with one or more components in the on-demand service system 100 (e.g., the server 110, the passenger terminal 130, the driver terminal 140). One or more components in the on-demand service system 100 may access the data or instructions stored in the data storage 150 via the network 120. In some embodiments, the data storage 150 may be directly connected to or communicate with one or more components in the on-demand service system 100 (e.g., the server 110, the passenger terminal 130, the driver terminal 140). In some embodiments, the data storage 150 may be part of the server 110.

In some embodiments, one or more components in the on-demand service system 100 (e.g., the server 110, the user terminal) may have a permission to access the data storage 150. In some embodiments, one or more components in the on-demand service system 100 may read and/or modify information relating to the service requester, driver, and/or the public when one or more conditions are met. For example, the server 110 may read and/or modify one or more users' information after a service. As another example, the driver terminal 140 may access information relating to the service requester when receiving a service request from the passenger terminal 130, but the driver terminal 140 may not modify the relevant information of the service requester.

In some embodiments, information exchanging of one or more components in the on-demand service system 100 may be achieved by way of requesting a service. The object of the service request may be any product. In some embodiments, the product may be a tangible product, or an immaterial product. The tangible product may include food, medicine, commodity, chemical product, electrical appliance, clothing, car, housing, luxury, or the like, or any combination thereof. The immaterial product may include a servicing product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used in the computer or mobile phone. The software and/or application may relate to socializing, shopping, transporting, entertainment, learning, investment, or the like, or any combination thereof. In some embodiments, the software and/or application relating to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle, etc.), a car (e.g., a taxi, a bus, a private car, etc.), a train, a subway, a vessel, an aircraft (e.g., an airplane, a helicopter, a space shuttle, a rocket, a hot-air balloon, etc.), or the like, or any combination thereof.

Figure 2:
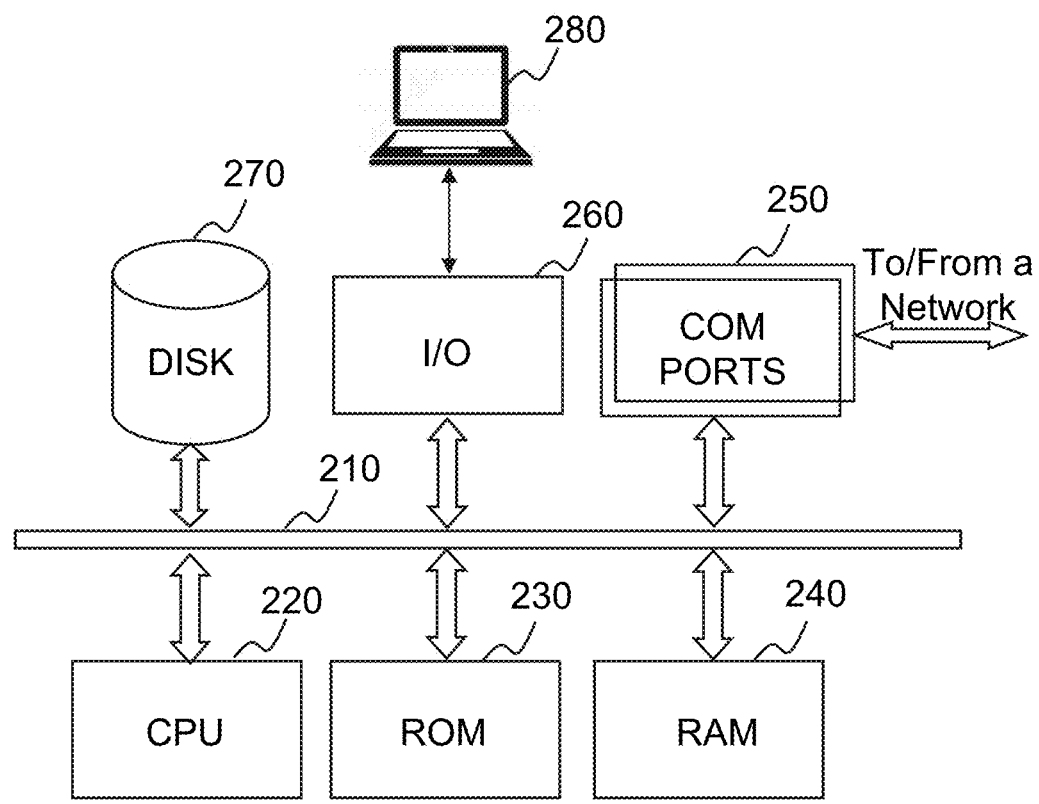
FIG. 2 is a block diagram of an exemplary computing device according to some embodiments of the present disclosure.

FIG. 2 is a schematic diagram illustrating exemplary hardware and software components of a computing device 200 on which the server 110, the passenger terminal 130, and/or the driver terminal 140 may be implemented according to some embodiments of the present disclosure. For example, the processing engine 112 may be implemented on the computing device 200 and configured to perform functions of the processing engine 112 disclosed in this disclosure.

The computing device 200 may be a general purpose computer or a special purpose computer, both may be used to implement an on-demand system for the present disclosure. The computing device 200 may be used to implement any component of the on-demand service as described herein. For example, the processing engine 112 may be implemented on the computing device 200, via its hardware, software program, firmware, or a combination thereof. Although only one such computer is shown, for convenience, the computer functions relating to the on-demand service as described herein may be implemented in a distributed fashion on a number of similar platforms, to distribute the processing load.

The computing device 200, for example, may include COM ports 250 connected to and from a network connected thereto to facilitate data communications. The computing device 200 may also include a central processing unit (CPU) 220, in the form of one or more processors, for executing program instructions. The exemplary computer platform may include an internal communication bus 210, program storage and data storage of different forms, for example, a disk 270, and a read only memory (ROM) 230, or a random access memory (RAM) 240, for various data files to be processed and/or transmitted by the computer. The exemplary computer platform may also include program instructions stored in the ROM 230, RAM 240, and/or other type of non-transitory storage medium to be executed by the CPU 220.

The methods and/or processes of the present disclosure may be implemented as the program instructions. The computing device 200 also includes an I/O component 260, supporting input/output between the computer and other components therein such as user interface elements 280. The computing device 200 may also receive programming and data via network communications.

The computing device 200 may also include a hard disk controller communicated with a hard disk, a keypad/keyboard controller communicated with a keypad/keyboard, a serial interface controller communicated with a serial peripheral equipment, a parallel interface controller communicated with a parallel peripheral equipment, a display controller communicated with a display, or the like, or any combination thereof.

Merely for illustration, only one CPU and/or processor is described in the computing device 200. However, it should be note that the computing device 200 in the present disclosure may also include multiple CPUs and/or processors, thus operations and/or method steps that are performed by one CPU and/or processor as described in the present disclosure may also be jointly or separately performed by the multiple CPUs and/or processors. For example, if in the present disclosure the CPU and/or processor of the computing device 200 executes both step A and step B, it should be understood that step A and step B may also be performed by two different CPUs and/or processors jointly or separately in the computing device 200 (e.g., the first processor executes step A and the second processor executes step B, or the first and second processors jointly execute steps A and B).

Figure 3:
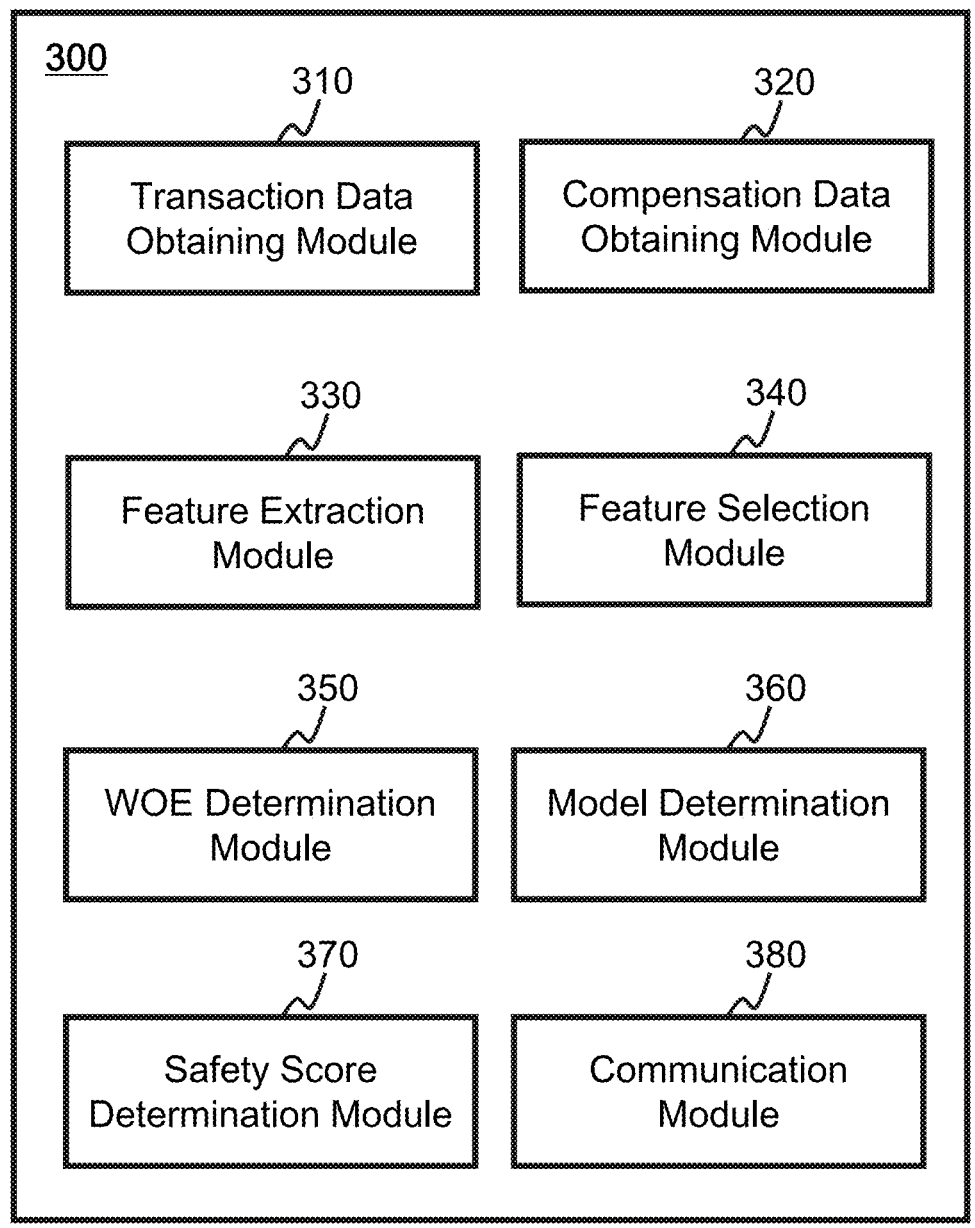
FIG. 3 is a block diagram of an exemplary processor according to some embodiments of the present disclosure.

FIG. 3 is a block diagram of an exemplary processor 300 according to some embodiments of the present disclosure. The processor 300 may be implemented in the server 110, the user terminal (e.g., the passenger terminal 130, the driver terminal 140), and/or the data storage 150. In some embodiments, the processor 300 may include a transaction data obtaining module 310, a compensation data obtaining module 320, a feature extraction module 330, a feature selection module 340, a weight of evidence (WOE) determination module 350, a model determination module 360, a safety score determination module 370, and a communication module 380.

Generally, the word "module" as used herein, refers to logic embodied in hardware or firmware, or to a collection of software instructions. The modules described herein may be implemented as software and/or hardware modules and may be stored in any type of non-transitory computer-readable medium or other storage device. In some embodiments, a software module may be compiled and linked into an executable program. It will be appreciated that software modules can be callable from other modules or from themselves, and/or can be invoked in response to detected events or interrupts. Software modules configured for execution on a computing device (e.g., processor 300) can be provided on a computer readable medium, such as a compact disc, a digital video disc, a flash drive, a magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in a firmware, such as an EPROM. It will be further appreciated that hardware modules can be included of connected logic units, such as gates and flip-flops, and/or can be included of programmable units, such as programmable gate arrays or processors. The modules or computing device functionality described herein are preferably implemented as software modules, but can be represented in hardware or firmware. In general, the modules described herein refer to logical modules that can be combined with other modules or divided into sub-modules despite their physical organization or storage.

The transaction data obtaining module 310 may obtain transportation service transaction data associated with a driver. In some embodiments, the transaction data obtaining module 310 may obtain the transportation service transaction data from the data storage 150.

The compensation data obtaining module 320 may obtain vehicle accident compensation data associated with one or more drivers. In some embodiments, the compensation data obtaining module 320 may obtain the vehicle accident compensation data from the data storage 150.

The feature extraction module 330 may extract features of the transportation service transaction data.

The feature selection module 340 may select one or more target features from the features extracted by the feature extraction module 330. The target features are associated with estimating a safety score associated with a driver.

The WOE determination module 350 may determine a weight of evidence of the features extracted from the transportation service transaction data.

The model determination module 360 may determine an estimation model for determining a safety score of a driver based on training data obtained by the transaction data obtaining module 310 and/or the compensation data obtaining module 320.

The safety score determination module 370 may determine a safety score of a driver based on the estimation model.

The communication module 380 may provide an offer to enter a contract to a driver based on the safety score associated with the driver. The offer may include a vehicle hailing request, a price request (that is associated with a vehicle insurance, a life insurance, an incentive evaluation, etc.), or the like, or any combination thereof.

One of ordinary skill in the art would understand that when an element of the on-demand service system 100 performs, the element may perform through electrical signals and/or electromagnetic signals. For example, when a passenger terminal 130 sends out a service request to the server 110, a processor of the passenger terminal 130 may generate an electrical signal encoding the request. The processor of the passenger terminal 130 may then send the electrical signal to an output port. If the passenger terminal 130 communicates with the server 110 via a wired network, the output port may be physically connected to a cable, which further transmit the electrical signal to an input port of the server 110. If the passenger terminal 130 communicates with the server 110 via a wireless network, the output port of the passenger terminal 130 may be one or more antennas, which convert the electrical signal to electromagnetic signal. Similarly, a driver terminal 140 may receive an instruction and/or service request from the server 110 via electrical signal or electromagnet signals. Within an electronic device, such as the passenger terminal 130, the driver terminal 140, and/or the server 110, when a processor thereof processes an instruction, sends out an instruction, and/or performs an action, the instruction and/or action is conducted via electrical signals. For example, when the processor retrieves or saves data from a storage medium, it may send out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 4:
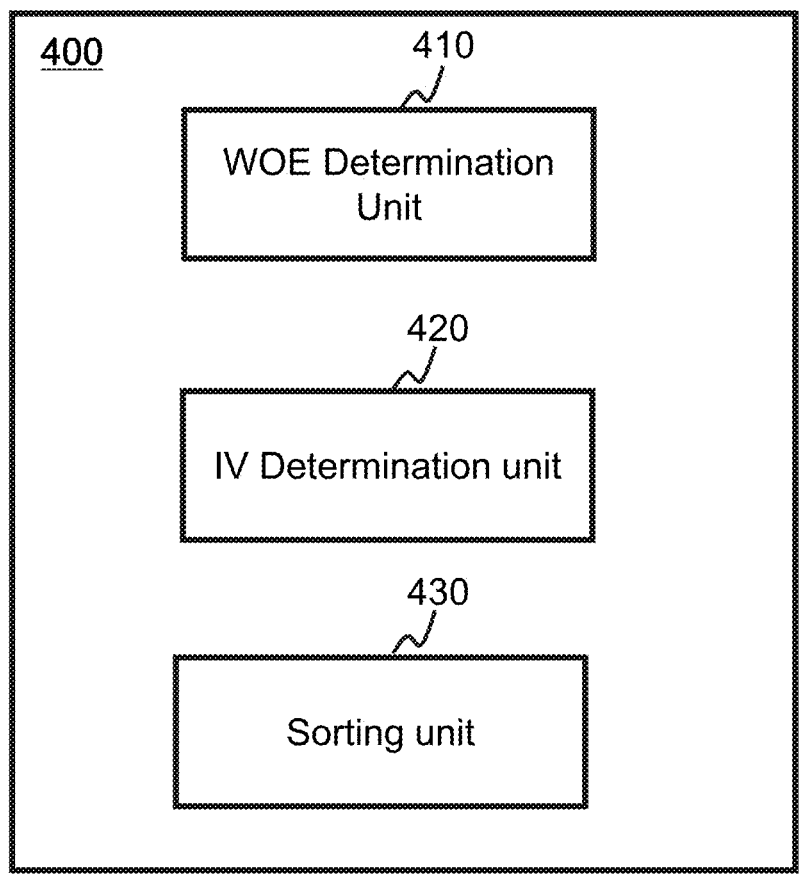
FIG. 4 is a block diagram of an exemplary feature selection module according to some embodiments of the present disclosure.

FIG. 4 is a block diagram of an exemplary feature selection module 400 according to some embodiments of the present disclosure. The feature selection module 400 may include a WOE determination unit 410, an information value (IV) determination unit 420, and a sorting unit 430.

The WOE determination unit 410 may determine a weight of evidence for each of the historical features extracted from the historical transportation service transaction data.

The IV determination unit 420 may determine information values (IVs) of the historical features extracted from the historical transportation service transaction data based on the WOE(s) of the historical features.

The sorting unit 430 may sort the historical IVs to determine the historical target features based on any suitable criterion and/or criteria.

Figure 5:
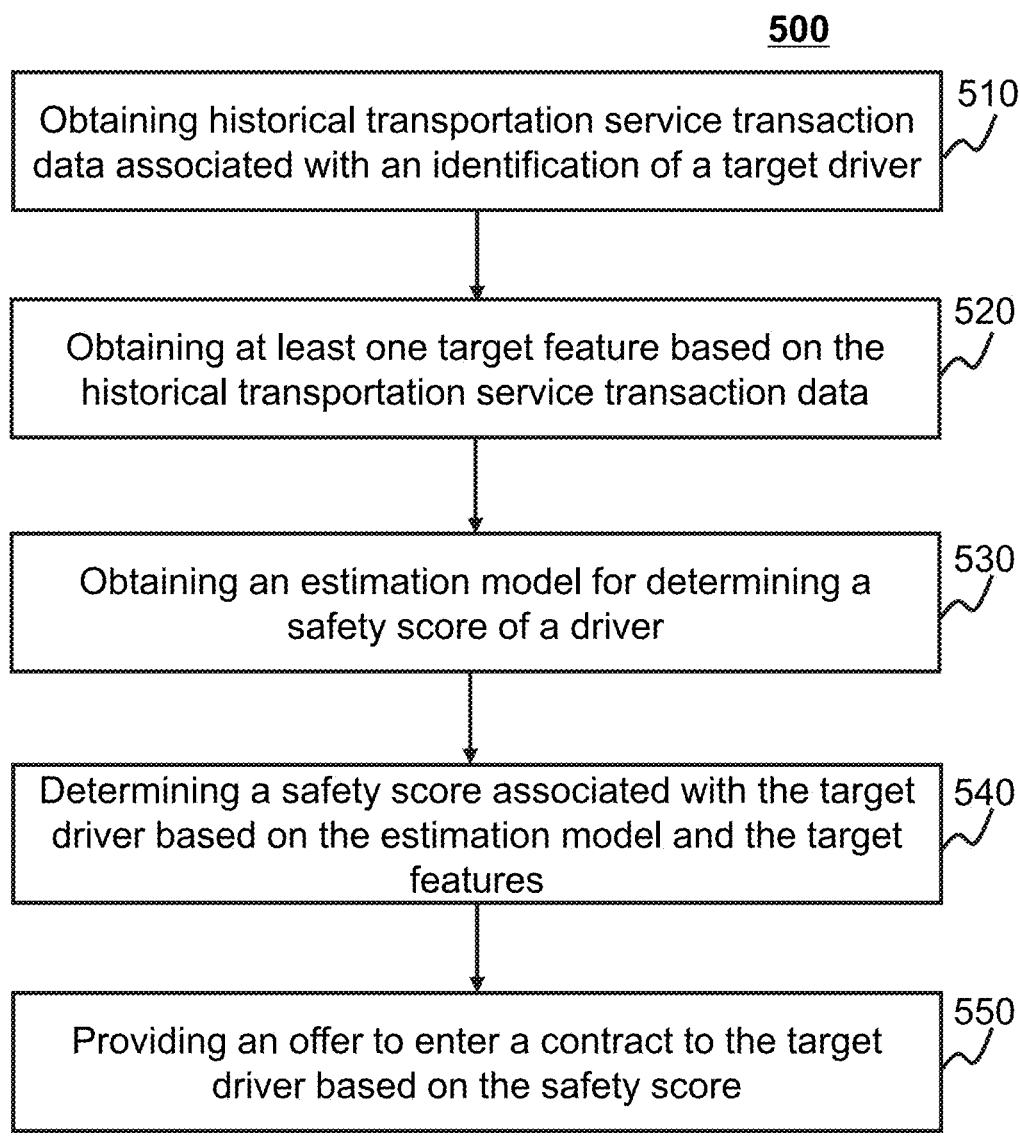
FIG. 5 is a flowchart of an exemplary process for determining a safety score associated with a target driver according to some embodiments of the present disclosure.

FIG. 5 is a flowchart of an exemplary process 500 for determining a safety score associated with a target driver according to some embodiments of the present disclosure. The process 500 may be performed by the on-demand service system introduced in FIGS. 1-4. For example, the process 500 may be implemented as one or more instructions stored in a non-transitory storage medium of the on-demand service system. When the processor 300 of the on-demand service system executes the set of instructions, the set of instructions may direct the processor 300 to perform the following steps of the process.

In step 510, the processor 300 (e.g., the transaction data obtaining module 310) may obtain historical transportation service transaction data associated with an identification of a target driver.

The target driver may be a user, such as a taxi driver, that may receive an offer from the online on-demand service system.

In some embodiments, the online on-demand service system may be an online taxi hailing service platform, such as DiDi Chuxing™. The target user may be a driver registered in the online on-demand service system (e.g., the online taxi hailing service platform). When a driver is available for accepting an order (e.g., a transportation service request), the online on-demand service system may obtain the identification of the user (e.g., the driver). In some embodiments, the online on-demand service system may include an online insurance service system. The target driver may include a person that may buy an insurance (e.g., a vehicle insurance, a life insurance) in the online on-demand service system (e.g., an online insurance service system).

The identification of the target driver may include a telephone number, an e-mail address, a profile image, a displayed name (e.g., a nickname), a documentation number (e.g., a driver license, an ID card, etc.), a third-party account, or the like, or any combination thereof.

The historical transportation service transaction data may include information of the target driver as a driver and/or passenger. The term "as a driver" may refer to that the target driver is a private driver or someone drives to make monetary profit (e.g., a driver who provides transportation service). The term "as a passenger" may refer to that the target driver takes a ride instead of driving. The historical transportation service transaction data may include profile data associated with the target driver, behavior data of historical transactions associated with the target driver, traffic data of historical transportation service transactions associated with the target driver, or the like, or any combination thereof.

In some embodiments, the profile data associated with the target driver may include basic information associated with the target driver and the driver's vehicle such as an age of the driver, driving experience, a vehicle age associated with the driver, etc.

In some embodiments, the behavior data of historical transportation service transactions associated with the target driver may include mileage data, timing data, velocity data, geographic region data, evaluation data, complaint data, abnormal transaction data, etc.

In some embodiments, the traffic data of historical transactions associated with the target driver may include road condition, congestion condition, weather condition, etc.

In some embodiments, the historical transportation service transactions data may be generated by using a location based service application (LBS) (e.g., a driving application, a map application, a navigation application, a social media application).

In some embodiments, the processor 300 may obtain the historical transportation service transaction data from the data storage 150 or the driver terminal 140. In some embodiments, the processor 300 may obtain the historical transportation service transaction data in a reference time period and/or a predetermined time period. In some embodiments, the reference time period may be a year (e.g., last year, current year, recent one year), half of a year (e.g., recent six months, the first half of current year), a quarter of a year (e.g., recent three months, the second quarter of current year), or the like, or any combination thereof.

In step 520, the processor 300 (e.g., the feature extraction module 330) may obtain at least one target feature based on the historical transportation service transaction data.

The target feature may be used for estimating a safety score of the target driver. The safety score may reflect a safety expectation of the target driver during transportation service. For example, the higher the safety score the lower probability of traffic accidents the driver may have. Thus a driver with a higher safety score may drive more safely compared with a driver that is associated with a lower safety score.

Accordingly, the target feature may include a mileage of driving, a mileage as a passenger, a number of nights in which the target driver provides transportation service, a percentage of complaint in a particular time period (e.g., last two months, last six months, last one year), driving experience, or the like, or any combination thereof. The mileage as a passenger associated with the target driver may refer to a travel length of the target driver taking a ride. The percentage of complaint may refer to a ratio between the number of transportation service transaction with a complaint and the number of transportation service transaction without a complaint in the particular time period.

In step 520, the processor 300 (e.g., the WOE determination module 350) may also determine a weight of evidence (WOE) of each of the target features. The determination of the WOEs of the target features may be made by performing one or more operations described in connection with step 820.

In step 530, the processor 300 may obtain an estimation model for determining a safety score of a driver. The estimation model may be a regression model. The regression model may include an ordinary least square model, a logistic regression model, a stepwise regression model, a multivariate adaptive regression spline model, a locally estimated scatterplot smoothing model, etc. In some embodiments, the estimation model may be trained in advance. Alternatively or additionally, the estimation model may be trained and/or updated in real time. In some embodiments, the estimation model may be obtained by performing one or more operations described in connection with FIG. 6.

In step 540, the processor 300 (e.g., the safety score determination 370) may determine the safety score associated with the target driver based on the estimation model and the target features. In some embodiments, the processor 300 may determine the safety score associated with the target driver based on the estimation model and the WOEs of the target features.

In some embodiments, the safety score may reflect a probability that the target driver would have a traffic accident in a reference time period and/or a predetermined time period. The traffic accident probability of the target driver, Pd, may be determined based on Equation 1:

$$Pd = x_1 \cdot v_1 + x_2 \cdot v_2 + \ldots + x_n \cdot v_n + b, \quad \text{Equation 1}$$

wherein, "$x_i$" may represent a WOE of one of the target features; "$v_i$" may represent a coefficient of the WOE determined based on the estimation model; "b" may represent a constant. The coefficients may indicate the relative significance of the target features in predicting the safety score associated with the target driver.

In some embodiments, the processor 300 may further process the probability to determine the safety score. The safety score may be presented as a numerical format (e.g., from 0 through 100, from 0 through 10, etc.), a character format (e.g., A, B, C, D . . . ), etc. The safety score may reflect a safety expectation of a driver during transportation services. If the safety score presented from 0 through 100, a driver with a safety score 90 may be a safer driver in comparison with a driver with a score 65. As another example, if the safety score presented as A, B, C, D . . . , a driver with a safety score A may be a safer driver in comparison with a driver with a safety score C. For brevity, the safety score may be presented from 0 through 100 in the following description of the present disclosure.

In step 550, the processor 300 (e.g., the communication module 380) may provide an offer to enter a contract to the target driver based on the safety score. The offer may be a vehicle hailing request, a price request associated with a vehicle insurance, a life insurance, an incentive of reward, or the like, or any combination thereof.

In some embodiments, the safety score may be used to allocate car hailing orders. For example, a driver with a high safety score may be allocated more transportation service orders and/or higher quality transportation service orders in comparison with a driver with a lower safety score.

In some embodiments, the safety score may be used to provide a discount in buying an insurance. For example, a driver with a safety score 90 may be provide an 85% discount in buying a vehicle insurance, while a driver with a safety score 65 may be provided no discount in buying the vehicle insurance.

In some embodiments, the safety score may be used to evaluate incentive of reward for drivers. For example, a driver with a safety score 90 may obtain more incentive of reward in comparison with a driver with a safety score 65. In some embodiments, the safety score may be used for vehicle rentals. For example, a vehicle rental company may provide a bigger discount and/or a cheaper quota to a renter driver with higher safety score (e.g., a driver with a safety score 90 may rent a vehicle free for 1 hour).

In some embodiments, the safety score may be used for managing driving license scores. For example, if a driver's safety score is 100, the driver may obtain a plus in the driving license scores.

Figure 6:
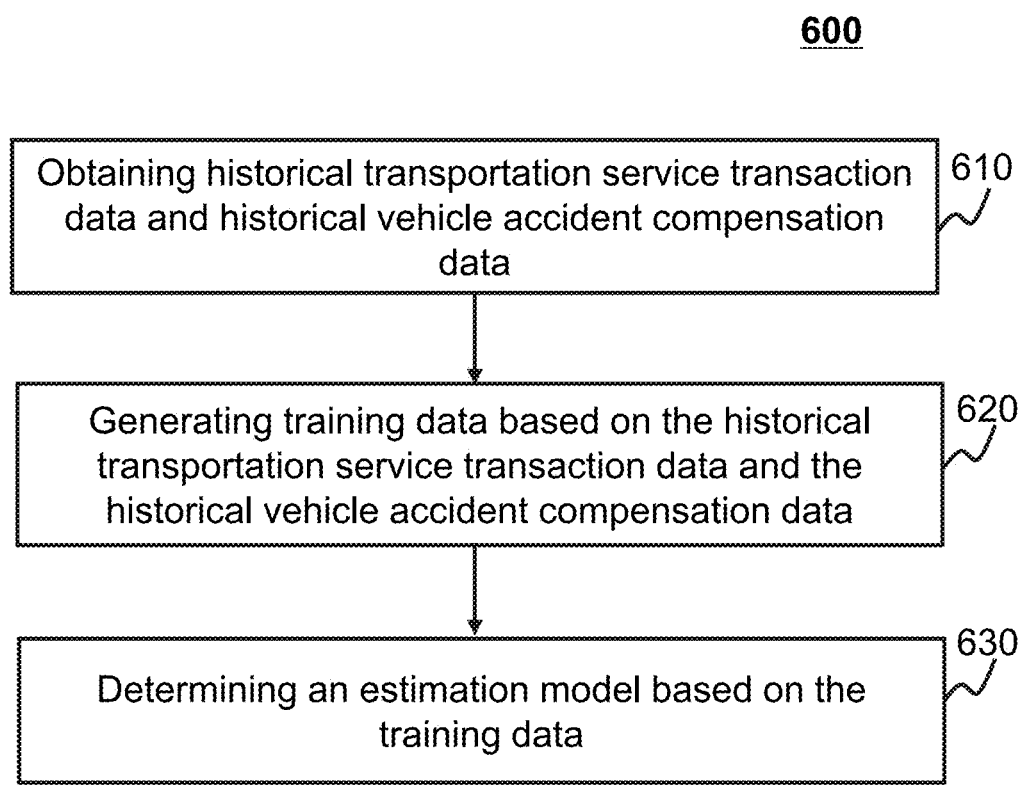
FIG. 6 is a flowchart of an exemplary process for determining an estimation model according to some embodiments of the present disclosure.

FIG. 6 is a flowchart of an exemplary process 600 for determining an estimation model for determining a safety score of a driver according to some embodiments of the present disclosure. The process 600 may be performed by the on-demand service system introduced in FIGS. 1-4. For example, the process 600 may be implemented as one or more instructions stored in a non-transitory storage medium of the on-demand service system. When the processor 300 of the on-demand service system executes the set of instructions, the set of instructions may direct the processor 300 to perform the following steps of the process.

In step 610, the processor 300 may obtain historical transportation service transaction data and historical vehicle accident compensation data associated with identifications of a plurality of drivers.

The historical transportation service transaction data associated with the plurality of drivers may include profile data, behavior data of historical transactions, traffic data of historical transportation service transactions, or the like, or any combination thereof.

In some embodiments, the profile data associated with the plurality of drivers may include basic information associated with the plurality of drivers and the plurality of drivers' vehicles, such as ages of the drivers, driving experience, vehicle ages associated with the drivers.

In some embodiments, the behavior data of historical transportation service transactions associated with the plurality of drivers may include mileage data, timing data, velocity data, geographic region data, evaluation data, complaint data, abnormal transaction data, etc.

In some embodiments, the traffic data of historical transactions associated with the plurality of drivers may include road condition, congestion condition, weather condition, etc.

In some embodiments, the processor 300 may obtain the historical transportation service transaction data and the historical vehicle accident compensation data within a predetermined length of time (i.e., reference time period) or within a predetermined time period. The vehicle accident compensation data may include whether a vehicle accident compensation occurs, the time of a vehicle accident compensation occurs, the number of times that vehicle accident compensation occur during the reference time period and/or the predetermined time period, or the like, or any combination thereof. The reference time period may be a year (e.g., last year, current year, recent one year), half of a year (e.g., recent six months, the first half of current year), a quarter of a year (e.g., recent three months, the second quarter of current year), or the like, or any combination thereof.

In some embodiments, the processor 300 may obtain the historical transportation service transaction data and the historical vehicle accident compensation data in a same step. In some embodiments, the processor 300 may obtain the historical transportation service transaction data and the historical vehicle accident compensation data in different steps. For example, the processor 300 may obtain the historical transportation service transaction data first and then obtain the historical vehicle accident compensation data associated with the historical transportation service transaction data.

In step 620, the processor 300 may generate training data based on the historical transportation service transaction data and the historical vehicle accident compensation data.

In some embodiments, the process 600 may further group the training data into one or more groups in step 620. The processor 300 may use the training data in different groups for different stages of training the estimation model. The processor 300 may group the training data based on a grouping rule. The grouping rule may include grouping the training data based on different ages of the drivers, based on driving experience of the drivers (e.g., the number of years and/or hours of driving vehicles), or other rules.

In step 630, the processor 300 (e.g., the model determination module 360) may determine an estimation model based on the training data. In some embodiments, the method and/or process of determining the estimation model may include several stages. Through the several stages of training, the processor 300 may determine the estimation model. The processor 300 may then use the estimation model to determine a safety score associated of the process 500 as described elsewhere in the present disclosure.

Figure 7:
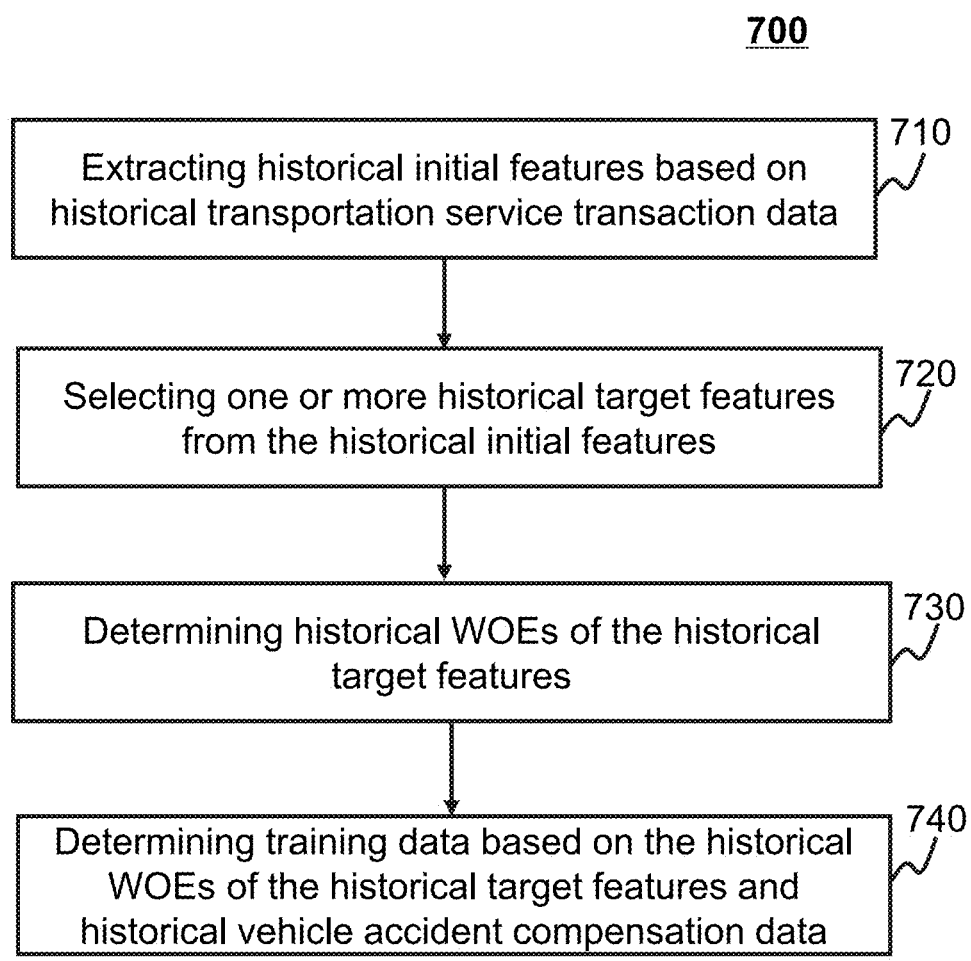
FIG. 7 is a flow chart of an exemplary process for determining the training data according to some embodiments of the present disclosure.

FIG. 7 is a flowchart of an exemplary process 700 for determining the training data based on the historical transportation service transaction data and the historical vehicle accident compensation data according to some embodiments of the present disclosure. The process 700 may be performed by the on-demand service system introduced in FIGS. 1-4. For example, the process 700 may be implemented as one or more instructions stored in a non-transitory storage medium of the on-demand service system. When the processor 300 of the on-demand service system executes the set of instructions, the set of instructions may direct the processor 300 to perform the following steps of the process.

In step 710, the processor 300 (e.g., the feature extraction module 330) may extract features (also referred to herein as historical initial features) based on historical transportation service transaction data.

In some embodiments, the historical initial features may include statistical data and/or basic data corresponding to each of drivers. In some embodiments, the statistical data corresponding to each of drivers may include mileage data, timing data, velocity data, geographic region data, evaluation data, complaint data, abnormal transaction data (e.g., a number of fraud transactions), or the like, or any combination thereof. The mileage data may include a mileage as a passenger, a driving mileage in current year, a driving mileage in last year, a driving mileage in a predetermined length of time, or the like, or any combination thereof. In some embodiments, the timing data may include the number of nights in which the driver provides transportation services in current year, the number of nights in which the driver provides transportation services in last year, the percentage of nights in which the driver provides transportation services in current year, the percentage of nights in which the driver provides transportation services in last year, the number of busy days in which the driver provides transportation services in last year, the percentage of busy days in last year, the number of busy days in current year, the number of work days in current year, the number of work days in last year, or the like, or any combination thereof. Here, a busy day may refer to a day that the driver works more than a predetermined number of hours. For example, the processor 300 may determine that a day is a busy day if the driver worked more than 8 hours that day. In some embodiments, the velocity data may include an average velocity of driving in last year, an average velocity of driving in current year, the times of over speeding, the times of sharp turns, the times of rapid accelerations, the times of rapid deceleration, or the like, or any combination thereof. In some embodiments, the geographic region data may include a geographic region that the driver frequently appears, a region that the driver's home and/or work place belongs to, etc. The evaluation data may include a percentage of different evaluations in recent six months. In some embodiments, the evaluations may be presented as one star, second stars, third stars, etc. More stars may represent higher evaluation. The evaluation may also be presented as other forms such as (high, middle, low), (A, B, C . . . ), or the like, or any combination thereof. In some embodiments, the complaint data may include a percentage of complaints from service requesters in recent six months, in last year, in current year, or the like, or any combination thereof. In some embodiments, the basic data may include an age of a vehicle associated with the driver, driving experience, an age of the driver, an age as a driver in the online taxi hailing transportation service platform.

In step 720, the processor 300 (e.g., the feature selection module 340) may select one or more historical target features from the historical initial features.

In some embodiments, the historical target features may be selected based on a WOE corresponding to each of the historical initial features. In some embodiments, the target features may be selected based on an IV (information value) associated with each of the historical initial features. In some embodiments, the historical target features may be obtained by performing one or more operations described in connection with FIG. 8.

In step 730, the processor 300 (e.g., the WOE determination module 350) may determine historical WOEs of the historical target features.

In some embodiments, a historical target feature may be divided $n_c$ categories, a binary historical vehicle accident compensation data may take on values "good" or "bad". As used herein, the term "good" may refer that in a condition corresponding to the category of the historical target feature, vehicle accident compensation occurs. The term "bad" may refer that in the condition corresponding to a category of the historical target feature, vehicle accident compensation does not occur. The WOE for a category of the historical target feature may be obtained in connection with the determination of WOE for a category of historical initial feature in FIG. 8. In some embodiments, the WOE of a historical target feature may be a sum of WOEs of the categories in the historical target feature. In some embodiments, the WOE of a historical target feature may be a sum of the absolute values of WOEs of the categories in the historical target feature.

In step 740, the processor 300 may determine the training data based on the historical WOE of each of the historical target features and historical vehicle accident compensation data. Based on the training data, the processor 300 may determine the estimation model.

Figure 8:
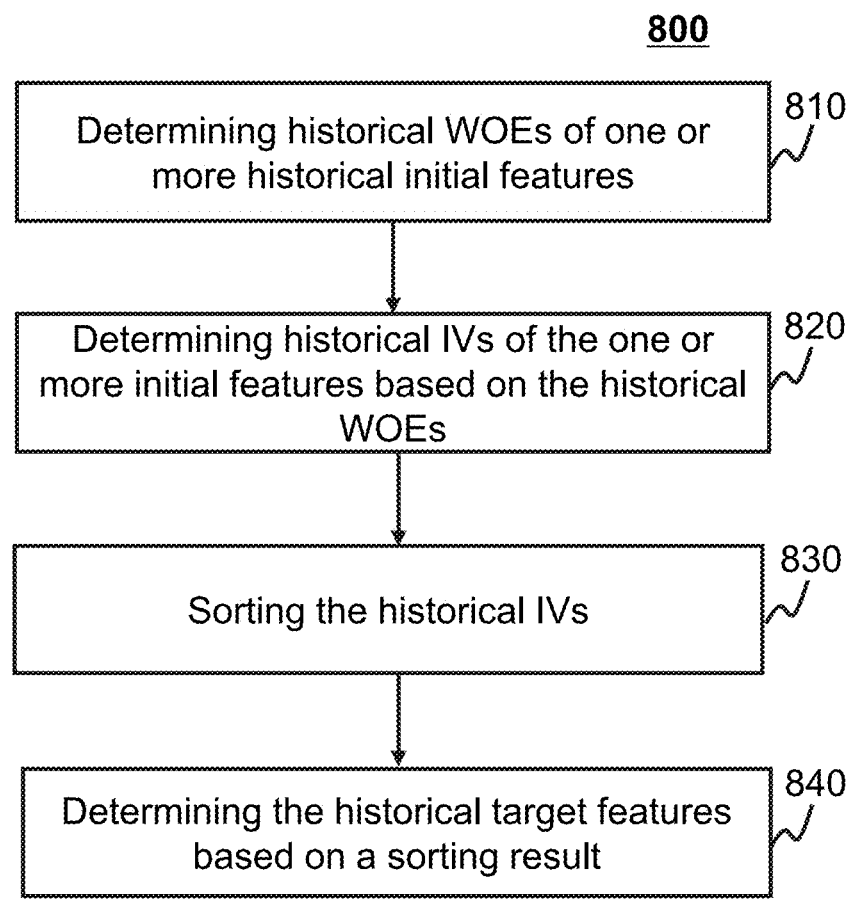
FIG. 8 is a flow chart of an exemplary process for determining historical target features according to some embodiments of the present disclosure.

FIG. 8 is a flowchart of an exemplary process 800 for determining one or more historical target features according to some embodiments of the present disclosure. The process 800 may be performed by the on-demand service system introduced in FIGS. 1-4. For example, the process 800 may be implemented as one or more instructions stored in a non-transitory storage medium of the on-demand service system. When the processor 300 of the on-demand service system executes the set of instructions, the set of instructions may direct the processor 300 to perform the following steps of the process.

In step 810, the processor 300 (e.g., the WOE determination unit 410 in the feature selection module 400) may determine historical WOE(s) of one or more historical initial features.

For each historical initial feature, the WOE may be determined by dividing the percentage of "good" by the percentage of "bad" and taking the natural logarithm of the quotient. As used herein, the term "good" may refer that in a condition corresponding to the historical initial feature, vehicle accident compensation occurs. The term "bad" may refer that in the condition corresponding to the historical initial feature, vehicle accident compensation does not occur.

In some embodiments, a historical initial feature may be divided $n_c$ categories, a binary vehicle accident compensation data may take on values "good" or "bad". The WOE for category c of the historical initial feature, $WOE_c$, may be expressed as Equation 2:

$$WOE_c = \ln\left[\frac{G_c/G}{B_c/B}\right], \qquad \text{Equation 2}$$

wherein, $G_c$ is the number of "good" in category c, $B_c$ is the number of "bad" in category c, $G=\sum_{i=1}^{n_c}B_i$ is the total number of "good," and $B=\sum_{i=1}^{n_c}B_i$ is the total number of "bad," wherein i is the index of category. In some embodiments, the WOE of a historical initial feature may be a sum of WOEs of the categories in the historical initial feature. In some embodiments, the WOE of a historical initial feature may be a sum of the absolute values of WOEs of the categories in the historical initial feature.

In step 820, the processor 300 (e.g., the IV determination unit 410 in the feature selection module 400) may determine a historical information value (IV) of historical initial features based on the WOEs of the historical initial features.

The IV may represent abilities of the historical initial features to estimate safety scores. The IV of the historical initial feature may be expressed as Equation 3:

$$IV = \sum_{c=1}^{n_c} \left(WOE_c \times \left(\frac{G_c}{G} - \frac{B_c}{B}\right)\right), \qquad \text{Equation 3}$$

wherein, $G_c$ is the number of "good" in category c, $B_c$ is the number of "bad" in category c, $G=\sum_{i=1}^{n_c}G_i$ is the total number of "good," and $B=\sum_{i=1}^{n_c}B_i$ is the total number of "bad," wherein i is the index of category.

In step 830, the processor 300 (e.g., the sorting unit 430 in the feature selection module 400) may sort the historical IVs based on a sorting rule.

The sorting rule may include sorting from large to small or from small to large. The sorting rule may include sorting features associated with profile data of a driver and features associated with behavior data of the driver respectively.

In step 840, the processor 300 may determine at least one historical target feature from the historical initial features based on the sorting result.

In some embodiments, the processor 300 may select a predetermined number of historical initial features as the historical target features. In some embodiments, the historical target features may correspond to the predetermined number of largest IVs. The predetermined number of historical target features may include a number from 1 to 50, or larger than 50. In some embodiments, the predetermined number may be from 1 to 10, from 11 to 20, from 21 to 30, from 31 to 40, from 41 to 50, or the like. In some embodiments, the historical target features may correspond to the largest five IVs. In some embodiments, the processor 400 may determine features of which the IVs belong to a predetermined range as the target values. The present disclosure may not limit the number of the target feature. The historical target feature may be associated with estimating a safety score of a driver. In some embodiments, the historical target feature may include a driving mileage in current year, a mileage as a passenger, a number of nights that a driver provides transportation service, a percentage of complaint in a period of time (e.g., recent six months, etc.), driving experience, or the like, or any combination thereof. The historical target feature may correspond to the target feature described in FIG. 5.

Figure 9:
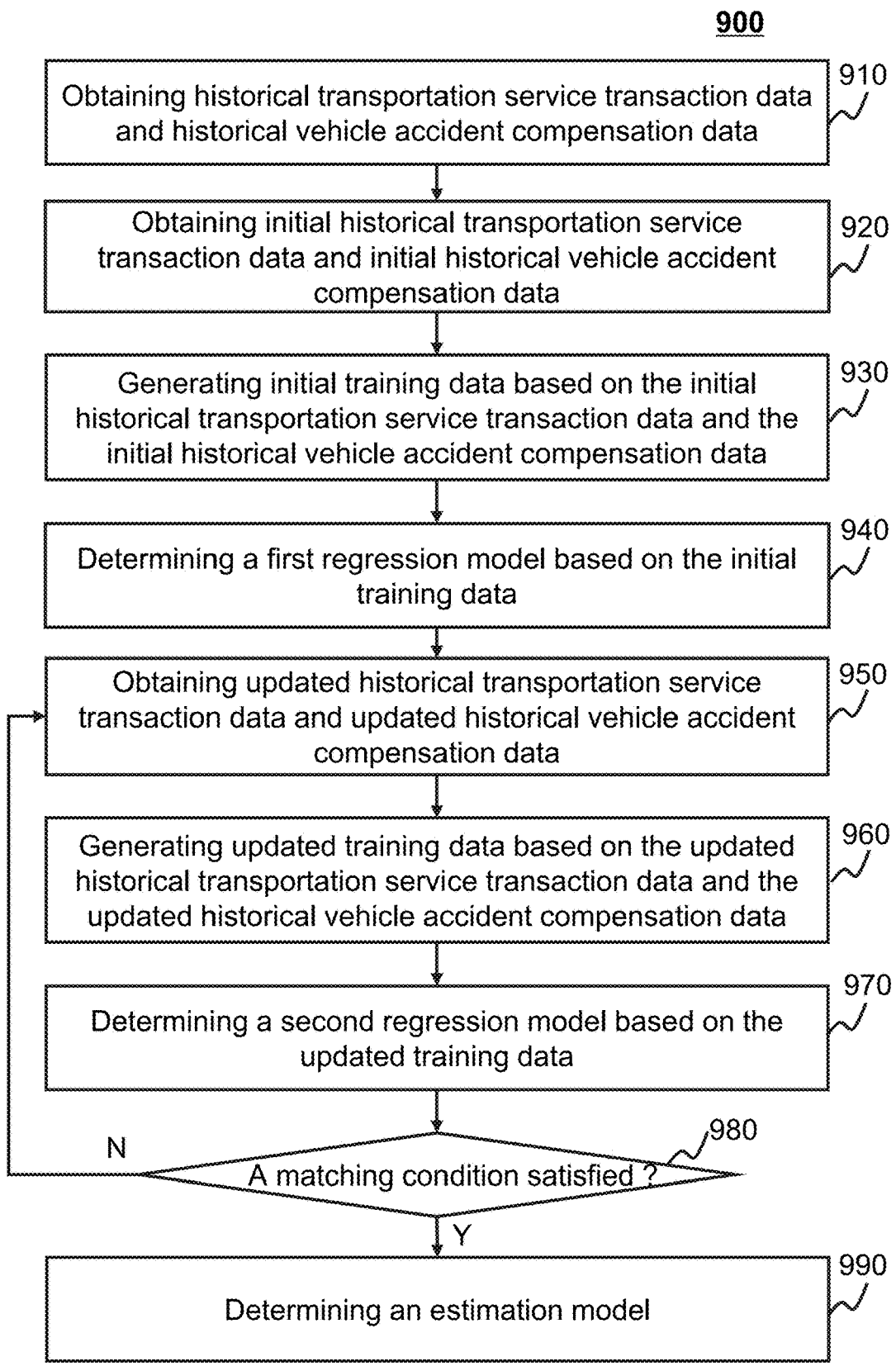
FIG. 9 is a flow chart of an exemplary process for training an estimation model according to some embodiments of the present disclosure.

FIG. 9 is a flowchart of an exemplary process for determining an estimation according to some embodiments of the present disclosure. The process 900 may be performed by the on-demand service system introduced in FIGS. 1-4. For example, the process 900 may be implemented as one or more instructions stored in a non-transitory storage medium of the on-demand service system. When the processor 300 of the on-demand service system executes the set of instructions, the set of instructions may direct the processor 300 to perform the following steps of the process.

In step 910, the processor 300 (e.g., the transaction data obtaining module 310 and the compensation data obtaining module 320) may obtain historical transportation service transaction data and historical vehicle accident compensation data.

In some embodiments, the processor 300 may obtain the historical transportation service transaction data and the historical vehicle accident compensation data from the data storage 150. The historical transportation service transaction data and the historical vehicle accident compensation data may be associated with a plurality of drivers. In some embodiments, the processor 300 may obtain the historical transportation service transaction data and the historical vehicle accident compensation data at a same step. In some embodiments, the processor 300 may obtain the historical transportation service transaction data and the historical vehicle accident compensation data at different steps.

In step 920, the processor 300 may obtain some transportation service transaction data (also referred to herein as initial historical transportation service transaction data) and some vehicle accident compensation data (also referred to herein as initial historical vehicle accident compensation data) from the historical transportation service transaction data and the historical vehicle accident compensation data.

In some embodiments, the processor 300 may extract a portion of the historical transportation service transaction data and the corresponding historical vehicle accident compensation data as the initial historical transportation service transaction data and the initial vehicle accident compensation data. In some embodiments, the processor 300 may group the historical transportation service transaction data and the historical vehicle accident compensation data into one or more groups based on the grouping rule. The grouping rule may include grouping the training data based on different ages of the drivers, based on different driving experiences of the drivers, or other rules. The processor 300 may determine data in one of the groups as the initial historical transportation service transaction data and the initial historical vehicle accident compensation data.

In step 930, the processor 300 may generate initial training data based on the initial historical transportation service transaction data and the initial historical vehicle accident compensation data.

In some embodiments, the processor 300 may extract one or more historical target features (also referred to herein as the first historical target features) from the initial historical transportation service transaction data, and then generate the initial training data based on the historical target features and the initial historical vehicle accident compensation data. In some embodiments, the processor 300 may determine a WOE for each of the historical target features. The processor 300 may then generate the initial training data based on the WOE(s) corresponding to the first historical target features and the initial historical vehicle accident compensation data.

The WOEs of the first historical target features may be determined, for example, by performing one or more operations described in connection with step 810.

In step 940, the processor 300 (e.g., the model determination module 360) may determine a first regression model based on the initial training data. The first regression model may include an ordinary least square model, a logistic regression model, a stepwise regression model, a multivariate adaptive regression spline model, a locally estimated scatterplot smoothing model, etc.

In step 950, the processor 300 may further obtain some transportation service transaction data (also referred to herein as updated historical transportation service transaction data) and some vehicle accident compensation data (also referred herein as updated historical vehicle accident compensation data) from the historical transportation service transaction data and the historical vehicle accident compensation data.

The determination of the updated historical transportation service transaction data and the updated historical vehicle accident compensation data may be made by performing one or more operations described in connection with step 920. The updated historical transportation service transaction data may be different from the initial historical transportation service transaction data. The updated historical vehicle accident compensation data may be different form the initial historical vehicle accident compensation data.

In step 960, the processor 300 may generate updated training data based on the updated historical transportation service transaction data and the updated historical vehicle accident compensation data.

In some embodiments, the processor 300 may extract one or more historical target features (also referred to herein as the second historical target features) from the updated historical transportation service transaction data, and then generate the updated training data based on the second historical target features and the updated historical vehicle accident compensation data. In some embodiments, the processor 300 may determine a WOE for each of the second historical target features. The processor 300 may then generate the updated training data based on the WOEs corresponding to the second historical target features and the updated historical vehicle accident compensation data.

In step 970, the processor 300 (e.g., the model determination module 360) may determine a second regression model based on the updated training data. In some embodiments, the processor 300 may use the updated training data to modify at least one parameter in the first regression model to determine the second regression model.

In step 980, the processor 300 may determine whether a matching condition is satisfied. If the matching condition is satisfied, the process 900 may go to step 990 to determine the second regression model as the estimation model. If the matching condition is not satisfied, the process 900 may loop back to step 950 to obtain updated historical transportation service transaction data and the updated historical vehicle accident compensation data to train the second regression model again.

In some embodiments, the matching condition may include determining whether a loss function converges to a first predetermined value. The processor 300 may determine the loss function based on the first regression model and/or the second regression model. If the loss function converges to the first predetermined value, the processor 300 may determine the second regression model as the estimation model in step 990. If the loss function does not converge to the first predetermined value, the processor 300 may loop back to step 950 again.

In some embodiments, the matching condition may include determining whether an error is less than a second predetermined value. For example, the processor 300 may select some data from the historical transportation service transaction data and the corresponding historical vehicle accident compensation data obtained in step 910 as testing historical transportation service transaction data and testing historical vehicle accident compensation data. The testing historical transportation service transaction data may be different from the initial and/or updated historical transportation service transaction data. The testing historical vehicle accident compensation data may be different from the initial and/or updated historical vehicle accident compensation data. The processor 300 may determine estimated vehicle accident compensation data based on the testing historical transportation service transaction data and the second regression model. Then the processor 300 may determine the error based on the estimated vehicle accident compensation data and the testing historical vehicle accident compensation data. If the error is less than the second predetermined value, the processor 300 may determine the second regression model as the estimation model in step 990. If the error is not less than the second predetermined value, the processor 300 may loop back to step 950 again.

In some embodiments, the matching condition may include determining whether the error is less than the second predetermined value and determining whether the loss function converges to the first predetermined value. The second predetermined value and the loss function may be any reasonable value.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device" or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

I claim:

1. A system, comprising:
    a storage medium storing a set of instructions for providing an offer to enter a contract to a driver;
    processing circuits in communication with the storage medium, wherein when executing the set of instructions, the processing circuits are directed to:
        obtain signals including historical transportation service transaction data associated with an identification of a target driver;
        determine a safety score associated with the target driver based on an estimation model and the historical transportation service transaction data associated with the identification of the target driver; and
        provide an offer to enter a contract to the target driver based on the safety score,
    wherein the estimation model is generated by the following operations:
        obtaining signals including historical transportation service transaction data and signals including historical vehicle accident compensation data associated with identifications of a plurality of drivers;
        generating training data based on the historical transportation service transaction data and the historical vehicle accident compensation data; and
        determining the estimation model based on the training data.

2. The system of claim 1, wherein the generating training data based on the historical transportation service transaction data and the historical vehicle accident compensation data further comprises:
    grouping the historical transportation service transaction data and historical vehicle accident compensation data into one or more groups; and
    generating the training data based on the historical transportation service transaction data and the historical vehicle accident compensation data associated with each of the one or more groups.

3. The system of claim 1, wherein the generating training data based on the historical transportation service transaction data and the historical vehicle accident compensation data further comprises:
    extracting historical initial features based on the historical transportation service transaction data;
    selecting one or more historical target features from the historical initial features; and
    generating the training data based on the historical target features and the historical vehicle accident compensation data.

4. The system of claim 3, wherein the selecting the historical target features from the historical initial features further comprises:
    determining a weight of evidence corresponding to each of the historical initial features;
    determining an information value associated with each of the historical initial features based on the weight of evidence corresponding to each the historical initial features; and
    determining the historical target features based on the information values associated with the historical initial features.

5. The system of claim 4, wherein the determining the historical target features based on the information values associated with the historical initial features further comprises:

sorting the information values based on a sorting rule; and
determining the historical target features based on the sorting result.

6. The system of claim 5, wherein the sorting rule includes sorting from large to small or from small to large.

7. The system of claim 6, wherein the determining the historical target features based on the sorting result comprises selecting a predetermined number of historical initial features as the historical target features, the historical target features corresponding to the predetermined number of largest IVs.

8. The system of claim 7, wherein the predetermined number of historical target features includes a number from 1 to 10.

9. The system of claim 7, wherein the predetermined number of historical target features includes 5.

10. The system of claim 4, wherein the generating the training data further comprises:
    generating the training data based on the weight of evidence corresponding to each of the historical target features.

11. The system of claim 1, wherein to determine the safety score associated with the target driver, the processing circuits are further directed to:
    extract a plurality of initial features based on the historical transportation service transaction data associated with the identification of the target driver;
    extract at least one target feature from the plurality of initial features;
    determine a weight of evidence corresponding to each of the at least one target feature; and
    determine the safety score associated with the target driver based at least in part on the weight of evidence corresponding to each of the at least one target feature and the estimation model.

12. The system of claim 1, wherein the estimation model based on the training data comprises:
    identifying initial historical transportation service transaction data and initial historical vehicle accident compensation data from the historical transportation service transaction data and the historical vehicle accident compensation data;
    determining a first regression model based on the initial historical transportation service transaction data and initial historical vehicle accident compensation data;
    identifying updated historical transportation service transaction data and updated historical vehicle accident compensation data from the historical transportation service transaction data and the historical vehicle accident compensation data; and
    modifying the first regression model based on the updated historical transportation service transaction data and the updated historical vehicle accident compensation data to determine a second regression model.

13. The system of claim 12, wherein the estimation model based on the training data further comprises:
    determining whether a matching condition is satisfied based on at least one of first regression model or the second regression model; and
    in response to determining that the matching condition is satisfied, determining the second regression model as the estimation model.

14. The system of claim 1, wherein the estimation model comprises a Logistic regression model.

15. A method for providing an offer to enter a contract to a driver, comprising:
    obtaining, by at least one computer, signals including historical transportation service transaction data associated with an identification of a target driver;
    determining, by the at least one computer, a safety score associated with the target driver based on an estimation model and the historical transportation service transaction data associated with the identification of the target driver; and
    providing, by the at least one computer, an offer to enter a contract to the target driver based on the safety score,
    wherein the estimation model is generated by the following operations:
        obtaining signals including historical transportation service transaction data and signals including historical vehicle accident compensation data associated with identifications of a plurality of drivers;
        generating training data based on the historical transportation service transaction data and the historical vehicle accident compensation data; and
        determining the estimation model based on the training data.

16. The method of claim 15, wherein the generating training data based on the historical transportation service transaction data and the historical vehicle accident compensation data further comprises:
    grouping the historical transportation service transaction data and historical vehicle accident compensation data into one or more groups; and
    generating the training data based on the historical transportation service transaction data and the historical vehicle accident compensation data associated with each of the one or more groups.

17. The method of claim 15, wherein the generating training data based on the historical transportation service transaction data and the historical vehicle accident compensation data further comprises:
    extracting historical initial features based on the historical transportation service transaction data;
    selecting one or more historical target features from the historical initial features; and
    generating the training data based on the historical target features and the historical vehicle accident compensation data.

18. The method of claim 17, wherein the selecting the historical target features from the historical initial features further comprises:
    determining a weight of evidence corresponding to each of the historical initial features;
    determining an information value associated with each of the historical initial features based on the weight of evidence corresponding to each the historical initial features; and
    determining the historical target features based on the information values associated with the historical initial features.

19. The method of claim 15, wherein the determining of the safety score associated with the target driver further comprises:
    extracting a plurality of initial features based on the historical transportation service transaction data associated with the identification of the target driver;
    extracting at least one target feature from the plurality of initial features;
    determining a weight of evidence corresponding to each of the at least one target feature; and determining the safety score associated with the target driver based at least in part on the weight of evidence corresponding to each of the at least one target feature and the estimation model.

20. A non-transitory computer-readable medium including executable instructions that, when executed by processing circuits, cause the medium to effectuate a method comprising:

obtaining historical transportation service transaction data associated with an identification of a target driver;

determining a safety score associated with the target driver based on an estimation model and the historical transportation service transaction data associated with the identification of the target driver; and providing an offer to enter a contract to the target driver based on the safety score, wherein the estimation model is generated by the following operations:

obtaining signals including historical transportation service transaction data and signals including historical vehicle accident compensation data associated with identifications of a plurality of drivers;

generating training data based on the historical transportation service transaction data and the historical vehicle accident compensation data; and determining the estimation model based on the training data.

\* \* \* \* \*